US012508504B2

(12) United States Patent
Jiang

(10) Patent No.: US 12,508,504 B2

(45) Date of Patent: Dec. 30, 2025

(54) OPERATION CONTROL METHOD AND APPARATUS, STORAGE MEDIUM, AND ELECTRONIC DEVICE

(71) Applicant: Tencent Technology (Shenzhen) Company Limited, Shenzhen (CN)

(72) Inventor: Shuai Jiang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 261 days.

(21) Appl. No.: 18/214,914

(22) Filed: Jun. 27, 2023

(65) Prior Publication Data

US 2023/0338844 A1 Oct. 26, 2023

Related U.S. Application Data

(63) Continuation of application No. PCT/CN2022/130837, filed on Nov. 9, 2022.

(30) Foreign Application Priority Data

Jan. 21, 2022 (CN) ......................... 202210074889.2

(51) Int. Cl.
*A63F 13/52* (2014.01)
*A63F 13/2145* (2014.01)

(52) U.S. Cl.
CPC .......... *A63F 13/52* (2014.09); *A63F 13/2145* (2014.09); *A63F 2300/308* (2013.01)

(58) Field of Classification Search
None
See application file for complete search history.

(56) References Cited

U.S. PATENT DOCUMENTS

2013/0076650 A1* 3/2013 Vik ..................... G06F 3/04186 345/173
2016/0220902 A1 8/2016 Howard et al.
(Continued)

FOREIGN PATENT DOCUMENTS

CN 101937302 A 1/2011
CN 107168611 A * 9/2017 ......... G06F 3/04812
(Continued)

OTHER PUBLICATIONS

Espacenet, Patent Translate JP2012073995A, 2025, https://translationportal.epo.org/emtp/translate/?ACTION=description-retrieval &COUNTRY=JP&ENGINE=google&FORMAT=docdb &KIND=A&LOCALE=en_EP&NUMBER=2012073995&OPS=ops.epo.org/3.2&SRCLANG=ja&TRGLANG=en , pp. 1-37 (Year: 2025).*

(Continued)

*Primary Examiner* — Tramar Harper
(74) *Attorney, Agent, or Firm* — Morgan, Lewis & Bockius LLP

(57) ABSTRACT

An operation control method is performed by an electronic device and includes: displaying a virtual operation button, the virtual operation button being configured to trigger execution of a target operation; in response to a target selection operation executed on the virtual operation button, setting a state of the target operation to a to-be-executed state; updating a display area of a virtual cancel button in accordance with a current distance between an operation position of the target selection operation and the virtual cancel button; and canceling the to-be-executed state of the target operation when the target selection operation terminates within the display area of the virtual cancel button.

20 Claims, 10 Drawing Sheets

(56) References Cited

U.S. PATENT DOCUMENTS

| | | | | |
|---|---|---|---|---|
| 2018/0028914 | A1* | 2/2018 | Yamaguchi | A63F 13/92 |
| 2018/0373406 | A1* | 12/2018 | Yan | G06F 3/0484 |
| 2019/0366213 | A1* | 12/2019 | Zhou | A63F 13/533 |
| 2020/0174618 | A1* | 6/2020 | Wang | G06F 3/0488 |

FOREIGN PATENT DOCUMENTS

| | | | | | |
|---|---|---|---|---|---|
| CN | 107422938 | A | | 12/2017 | |
| CN | 107479749 | A | | 12/2017 | |
| CN | 111330266 | A | * | 6/2020 | |
| CN | 111589142 | A | * | 8/2020 | A63F 13/2145 |
| CN | 111760274 | A | * | 10/2020 | A63F 13/42 |
| CN | 113908534 | A | | 1/2022 | |
| CN | 113996051 | A | | 2/2022 | |
| CN | 114428574 | A | | 5/2022 | |
| JP | 2012073995 | A | * | 4/2012 | |

OTHER PUBLICATIONS

Tencent Technology (Shenzhen) Company Limited, ISR, PCT/CN2022/130837, Jan. 18, 2023, 3 pgs.

Tencent Technology, WO, PCT/CN2022/130837, 18JAN2023, 6 pgs.

Tencent Technology, Japanese Office Action, JP Patent Application No. 2024-525862, Jan. 10, 2025, 9 pgs.

* cited by examiner

OPERATION CONTROL METHOD AND APPARATUS, STORAGE MEDIUM, AND ELECTRONIC DEVICE

CROSS-REFERENCE TO RELATED APPLICATIONS

This application is a continuation application of PCT Patent Application No. PCT/CN2022/130837, entitled "OPERATION CONTROL METHOD AND APPARATUS, STORAGE MEDIUM, AND ELECTRONIC DEVICE" filed on Nov. 9, 2022, which claims priority to Chinese Patent Application No. 202210074889.2, entitled "OPERATION CONTROL METHOD AND APPARATUS, STORAGE MEDIUM, AND ELECTRONIC DEVICE" filed with the China National Intellectual Property Administration on Jan. 21, 2022, all of which is incorporated by reference in its entirety.

FIELD OF THE TECHNOLOGY

This application relates to the field of computers, and specifically, to an operation control method and apparatus, a storage medium, a computer program product, and an electronic device.

BACKGROUND OF THE DISCLOSURE

After a target operation is triggered, whether the triggered target operation is executed or execution is canceled is often determined, and further control is performed on the target operation according to a determination result. However, in related technologies, the method for determining whether the foregoing target operation is executed or execution is canceled is not accurate enough and easily causes misjudgment and other the problems. Therefore, there is a problem of low accuracy of operation control.

SUMMARY

Embodiments of this application provide an operation control method and apparatus, a storage medium, a computer program product, and an electronic device.

In an aspect, the embodiments of this application provide an operation control method performed by a computer device and includes: displaying a virtual operation button, the virtual operation button being configured to trigger execution of a target operation; in response to a target selection operation executed on the virtual operation button, setting a state of the target operation to a to-be-executed state; updating a display area of a virtual cancel button in accordance with a current distance between an operation position of the target selection operation and the virtual cancel button; and canceling the to-be-executed state of the target operation when the target selection operation terminates within the display area of the virtual cancel button.

In an aspect, the embodiments of this application provide a non-transitory computer-readable storage medium, which stores a computer-readable instruction that, when executed by a processor of an electronic device, causes the electronic device to implement the foregoing operation control method.

In still another aspect, the embodiments of this application further provide an electronic device, which includes a memory, a processor, and a computer-readable instruction stored in the memory and operable on the processor. The foregoing processor executes the computer-readable instruction to perform the foregoing operation control method.

Details of one or more embodiments of this application are provided in the following drawings and descriptions. Other features, objectives, and advantages of this application will become apparent from the description, the drawings, and the claims.

BRIEF DESCRIPTION OF THE DRAWINGS

In order to more clearly describe the technical solutions in the embodiments of this application or the related art, the following will briefly introduce the drawings that need to be used in the description of the embodiments or the related art. Obviously, the drawings described here are used to provide a further understanding of this application and constitute a part of this application. The exemplary embodiments of this application and descriptions thereof are used to explain this application and do not constitute an improper limitation to this application. Those skilled in the art may obtain other drawings based on these drawings without involving any inventive effort. In the drawings.

DESCRIPTION OF EMBODIMENTS

Figure 1:
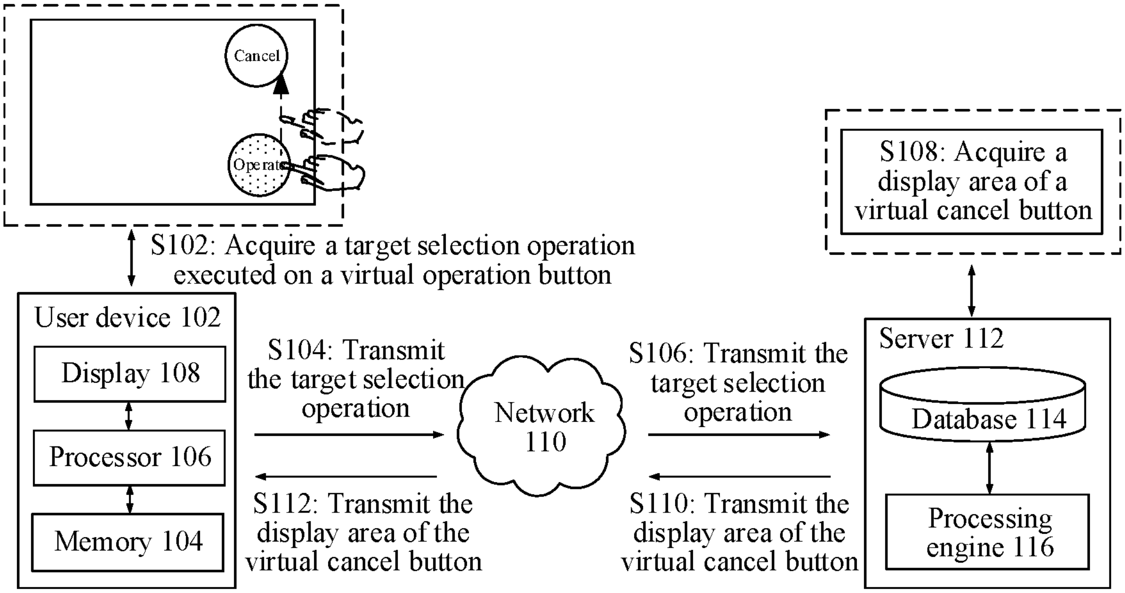
FIG. 1 is a schematic diagram of an application environment of an operation control method according to an embodiment of this application.

In order to make those skilled in the art to better understand the solutions of this application, the technical solutions in the embodiments of this application will be clearly and completely described below with reference to the drawings in the embodiments of this application. Obviously, the described embodiments are only some but not all of the embodiments of this application. All other embodiments obtained by those of ordinary skill in the art based on the embodiments of this application without involving any inventive effort shall fall within the scope of protection of this application.

The terms "first", "second", and the like used in the description, the claims, and the foregoing drawings of this application are used to distinguish similar objects, and not necessarily used to describe specific order or precedence order. It is to be understood that such used data is interchangeable where appropriate so that the embodiments of this application described here can be implemented in an order other than those illustrated or described here. In addition, the terms "include" and "have", as well as any other variation thereof are intended to cover a non-exclusive inclusion. For example, a process, method, system, product or device that includes a list of steps or units is not necessarily limited to those expressly listed steps or units, but may include other steps or units not expressly listed or inherent to such a process, method, system, product or device.

In an aspect, the embodiments of this application provide an operation control method. In some embodiments, the foregoing operation control method may be applied to, but is not limited to, an environment shown in FIG. 1. The environment may include, but is not limited to, a user device 102, a network 110, and a server 112. The user device 102 may include, but is not limited to, a display 108, a processor 106, and a memory 104.

The method includes the following specific steps:

- step S102: The user device 102 acquires a target selection operation executed on a virtual operation button;
- steps S104 to step S106: The user device 102 transmits the target selection operation to the server 112 through the network 110;
- step S108: The server 112 searches for relevant position data of a virtual cancel button through a database 114, and processes the relevant position data and an operation position of the target selection operation through a processing engine 116 so as to acquire a display area of the virtual cancel button; and
- step S110 to step S112: The server 112 transmits the display area of the virtual cancel button to the user device 102 through the network 110, and the processor 106 of the user device 102 will adjust the virtual cancel button according to the obtained display area, display the adjusted virtual cancel button in the display 108, and store the adjusted virtual cancel button in the memory 104.

In addition to the example shown in FIG. 1, the foregoing steps may be performed by the user device 102 alone, that is, the steps of acquiring the display area of the virtual cancel button and the like are performed by the user device 102, so as to relieve the processing pressure of the server. The user device 102 includes, but is not limited to, a handheld device (such as a mobile phone), a notebook computer, a desktop computer, an on-board device, and the like, and the specific implementation of the user device 102 is not defined herein.

Figure 2:
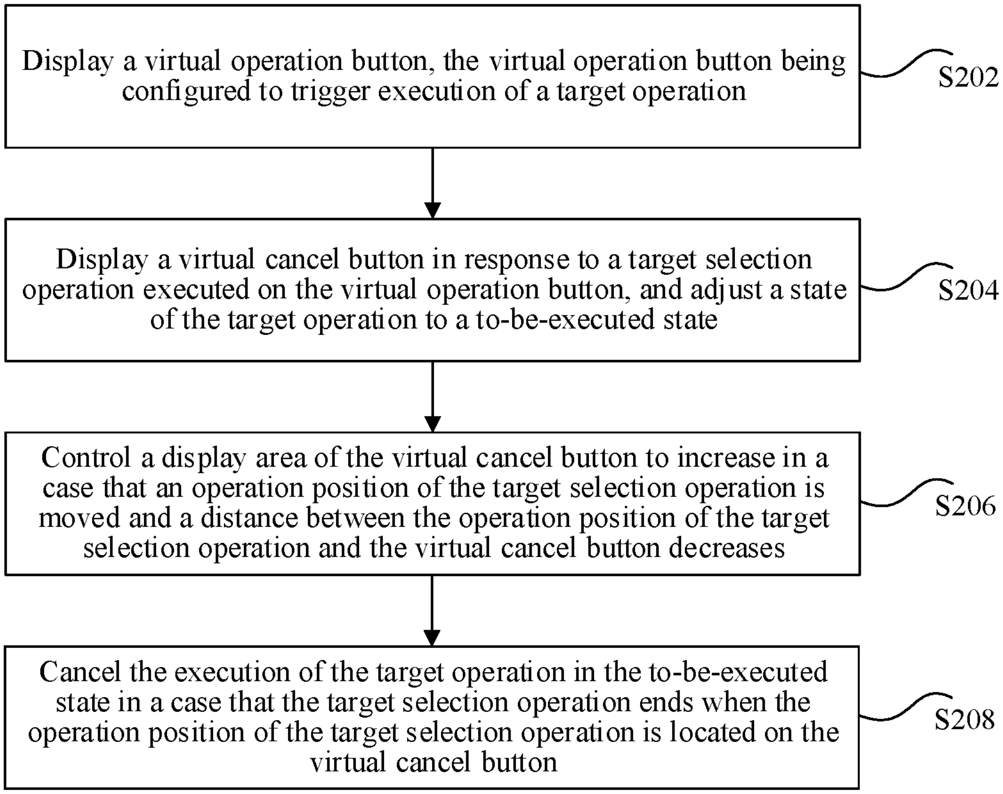
FIG. 2 is a schematic flowchart of an operation control method according to an embodiment of this application.

In some embodiments, as shown in FIG. 2, the operation control method is performed by a computer device, and specifically, may be performed by the user device shown in FIG. 1. The method includes:

- S202: Display a virtual operation button, the virtual operation button being configured to trigger execution of a target operation;
- S204: Display a virtual cancel button in response to a target selection operation executed on the virtual operation button, and adjust a state of the target operation to a to-be-executed state, the virtual cancel button being configured to cancel the execution of the target operation;
- S206: Control a display area of the virtual cancel button to increase when an operation position of the target selection operation is moved and a distance between the operation position of the target selection operation and the virtual cancel button decreases; and
- S208: Cancel the execution of the target operation in the to-be-executed state when the target selection operation ends when the operation position of the target selection operation is located on the virtual cancel button.

In some embodiments, in this embodiment, the foregoing operation control method may be applied to, but is not limited to, a cancel execution scenario of a target operation, and in the cancel execution scenario, the foregoing operation control method may be, but is not limited to, triggering of the execution of a target operation by using a virtual operation button, and then cancellation of the execution of the target operation by a plurality of methods. The plurality of methods may include, but are not limited to, cancellation of the execution of a target operation by using a virtual cancel button, or cancellation of the execution of the target operation when a distance between the operation position of the target selection operation and the virtual operation button reaches a target cancel threshold when the target selection operation executed on the virtual operation button is acquired. The foregoing operation control method may be, but not limited to, the foregoing method for canceling the execution of the target operation by using the virtual cancel button, or solution of the technical problem of low accuracy of operation control existing in the foregoing method for canceling the execution of the target operation by using the virtual cancel button.

In some embodiments, in this embodiment, in the foregoing method for canceling the execution of the target operation by using the virtual cancel button, the display area of the virtual cancel button is often fixed, but the fixed display area does not consider that in an actual scenario, a user usually wants to cancel the execution of the target operation in a more efficient way. Furthermore, in order to meet the foregoing needs of the user, the user's intention to cancel the execution of the target operation is fed back through the distance between the operation position of the target selection operation and the virtual cancel button. The display area of the virtual cancel button is controlled to increase when the distance between the operation position of the target selection operation and the virtual cancel button decreases, or the foregoing intention is acquired, so as to provide a more efficient way for the user to cancel the execution of the target operation, thereby achieving the technical effect of improving the accuracy of operation control.

In some embodiments, in this embodiment, the virtual operation button is configured to trigger execution of a target operation. In an embodiment, a method for triggering the target operation on the virtual operation button may include, but is not limited to: at least one of clicking, long-pressing, and sliding. The user may trigger the virtual operation button by at least one trigger method of clicking, long-pressing, and sliding, so as to trigger the execution of the target operation, thereby supporting the target operation triggering in various scenarios. Generally, the method for triggering the target operation by using the virtual operation button may be understood as, but is not limited to, setting a state of the target operation to a to-be-executed state. The target operation in the to-be-executed state will be allowed to be further controlled to be executed or the execution will be canceled. Or, when the execution of the target operation is triggered by using the virtual operation button, the user's control intention for the target operation is not clear, so a buffer state is reserved for the user to execute a next control operation.

In some embodiments, in this embodiment, the virtual cancel button is configured to cancel the execution of the target operation. The virtual cancel button may be set to be, but is not limited to, displayed when the target selection operation executed on the virtual operation button is acquired, or may be set to be, but is not limited to, hidden when the target selection operation executed on the virtual operation button is not acquired. In this way, the degree of influence of the virtual cancel button on the user operation may be, but is not limited to, reduced, thereby achieving the display validity of the virtual cancel button.

In some embodiments, in this embodiment, display forms of the virtual operation button and the virtual cancel button are not defined. For example, the shapes may be, but are not limited to, a rectangle, a circle, a polygon, an irregular shape, and the like. For example, adjustable state parameters may include, but are not limited to, transparency, chroma, contrast, and the like.

In some embodiments, in this embodiment, the user device may display, but is not limited to, the virtual operation button and hide the virtual cancel button when the target selection operation executed on the virtual operation button is not acquired; and the user device displays the virtual cancel button when the target selection operation executed on the virtual operation button is acquired, thereby reducing the occlusion of the user's line of sight by the virtual cancel button when the virtual cancel button is not needed. In addition, the user device may also, but is not limited to, display the virtual operation button and a virtual operation button identifier when the target selection operation executed on the virtual operation button is not acquired. The virtual operation button identifier is used for representing a hidden position of the virtual operation button, so that the user may still clearly determine a position of the virtual operation button when the virtual operation button is hidden, and may further efficiently use the virtual cancel button to cancel the execution of the target operation when the target selection operation executed on the virtual operation button is acquired. A display area of the virtual operation button identifier may be set with, but is not limited to, an area upper limit value to reduce the occlusion of the user's line of sight by the virtual operation button identifier.

In some embodiments, in this embodiment, the states of the target operation may include, but are not limited to, at least one of a to-be-triggered state, a to-be-executed state, and an executing state. The user device may adjust, but is not limited to, the state of the target operation from the to-be-triggered state to the to-be-executed state in response to the target selection operation executed on the virtual operation button. Further, the user device cancels the execution of the target operation in the to-be-executed state, or the user device adjusts the state of the target operation from the to-be-executed state to the to-be-triggered state when the target selection operation ends when the operation position of the target selection operation is located on the virtual cancel button. In addition, the user device adjusts the state of the target operation from the to-be-executed state to the executing state when the operation position of the target selection operation is not within a cancel area range when the target selection operation ends. The cancel area range may include, but is not limited to, a button range associated with the virtual cancel button.

In an embodiment, the operation of adjusting a state of the target operation to a to-be-executed state includes: the state of the target operation is adjusted from a to-be-triggered state to the to-be-executed state.

The triggered target operation is adjusted from the to-be-triggered state to the to-be-executed state in response to the target selection operation executed on the virtual operation button, and the target operation in the to-be-executed state may be further controlled to be executed or the execution is canceled, so that a buffer state can be reserved for the user to execute a next control operation.

Further, the operation of canceling the execution of the target operation in the to-be-executed state includes: the state of the target operation is adjusted from the to-be-executed state to the to-be-triggered state.

The target selection operation ends when the operation position of the target selection operation is located on the virtual cancel button, indicating that the user needs to cancel the execution of the target operation. The user device adjusts the state of the target operation from the to-be-executed state to the to-be-triggered state, so as to cancel the execution of the target operation.

In this embodiment, the user device controls the triggering and cancellation of the target operation by switching the state of the target operation, which can reduce the occurrence of misoperation and help improve the accuracy of the operation.

In an embodiment, the operation control method further includes: the state of the target operation is adjusted from the to-be-executed state to the executing state when the operation position of the target selection operation is not within a cancel area range associated with the virtual cancel button when the target selection operation ends. The cancel area range may include a button range associated with the virtual cancel button. The operation position of the target selection operation is not within the cancel area range associated with the virtual cancel button when the target selection operation ends, indicating that the user does not need to cancel the execution of the target operation. The user device adjusts the state of the target operation from the to-be-executed state to the executing state, so as to execute the target operation. The execution and cancellation of setting a to-be-executed state for a target operation are buffered, which can reduce the occurrence of misoperation and help improve the accuracy of the operation.

In some embodiments, in this embodiment, in the process of moving the operation position of the target selection operation, the user device may acquire, but is not limited to, movement information about the operation position of the target selection operation, such as movement direction information, movement distance information, and movement speed information. The distance between the operation position of the target selection operation and the virtual cancel button may be acquired, but is not limited to, according to the foregoing movement direction information and/or movement distance information. The movement speed information may be associated with, but is not limited to, the controlled display area of the virtual cancel button. For example, the faster the movement speed of the operation position of the target selection operation is, the faster the display area of the virtual cancel button is controlled to increase, and vice versa.

In some embodiments, in this embodiment, the distance between the operation position of the target selection operation and the virtual cancel button may be, but is not limited to, a distance between the operation position of the target selection operation and a button center of the virtual cancel button. In some embodiments, in this embodiment, the display area of the virtual cancel button that is controlled to increase may be correlated with, but is not limited to, the distance between the operation position of the target selection operation and the virtual cancel button that decreases. For example, the shorter the distance between the operation position of the target selection operation and the virtual cancel button is, the larger the controlled display area of the virtual cancel button is.

In some embodiments, in this embodiment, the display area of the virtual cancel button may be set with, but is not limited to, an upper limit display area and a lower limit display area. The lower limit display area may be understood as, but is not limited to, an initial display area of the virtual cancel button, and the upper limit display area may be understood as, but is not limited to, a maximum display area that the virtual cancel button can be controlled to increase.

In an embodiment, the virtual cancel button is in a circular shape, and a radius of the virtual cancel button is negatively correlated with the distance between the operation position of the target selection operation and the virtual cancel button.

Specifically, the virtual cancel button is in a circular shape, and the display area of the virtual cancel button is positively correlated with the radius of the virtual cancel button. The longer the radius of the virtual cancel button is, the larger the display area of the virtual cancel button in the user device is. The radius of the virtual cancel button is negatively correlated with the distance between the operation position of the target selection operation and the virtual cancel button, that is, the shorter the distance between the operation position of the target selection operation and the virtual cancel button is, the longer the radius of the virtual cancel button is, and the larger the display area of the virtual cancel button is, which is beneficial for the user to trigger cancellation.

In this embodiment, with regard to the circular-shaped virtual cancel button, the radius of the virtual cancel button is negatively correlated with the distance between the operation position of the target selection operation and the virtual cancel button, so that the shorter the distance between the operation position of the target selection operation and the virtual cancel button is, the larger the display area of the virtual cancel button is, which is beneficial for the user to trigger cancellation and helps improve the efficiency of operation control.

Figure 3:
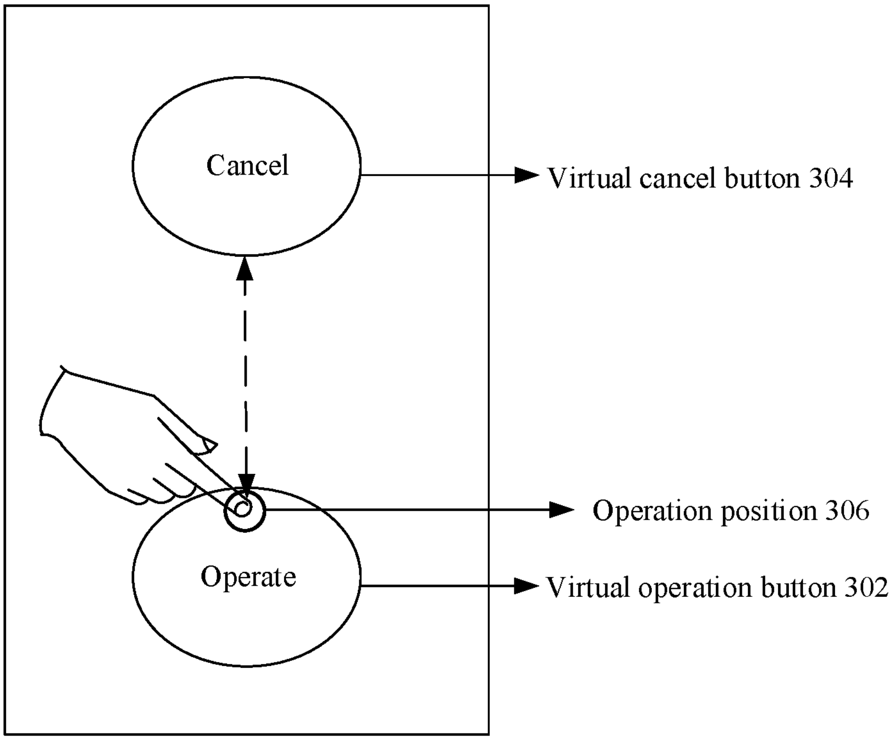
FIG. 3 is a schematic diagram of an operation control method according to an embodiment of this application.

As a further example, as shown in FIG. 3, if an adjustable radius of a virtual cancel button 304 is r (a minimum radius corresponding to the lower limit display area is r1, and a maximum radius corresponding to the upper limit display area is r2); and a distance a between the virtual cancel button 304 and an operation position 306 of a virtual operation button 302 is acquired, and the adjustable radius r is obtained according to a formula $r=x/a$, where, x is a constant and may be flexibly set according to the distance between the virtual operation button 302 and the virtual cancel button 304. Specifically, for example, a distance between the center of a circle of the virtual cancel button 304 and the operation position 306 of the virtual operation button 302 is set as a1, $r1=x/a1$ is obtained, and a value of x is obtained.

Furthermore, according to a set value of r2 and the determined value of x, a shortest distance a2 between the center of the circle of the virtual cancel button 304 and the operation position 306 of the virtual operation button 302 is derived, and $r2=x/a2$ is obtained, that is, the virtual cancel button 304 may no longer be, but is not limited to, allowed to be controlled to enlarge when the distance between the center of the circle of the virtual cancel button 304 and the operation position 306 of the virtual operation button 302 is less than or equal to a2.

Figure 4:
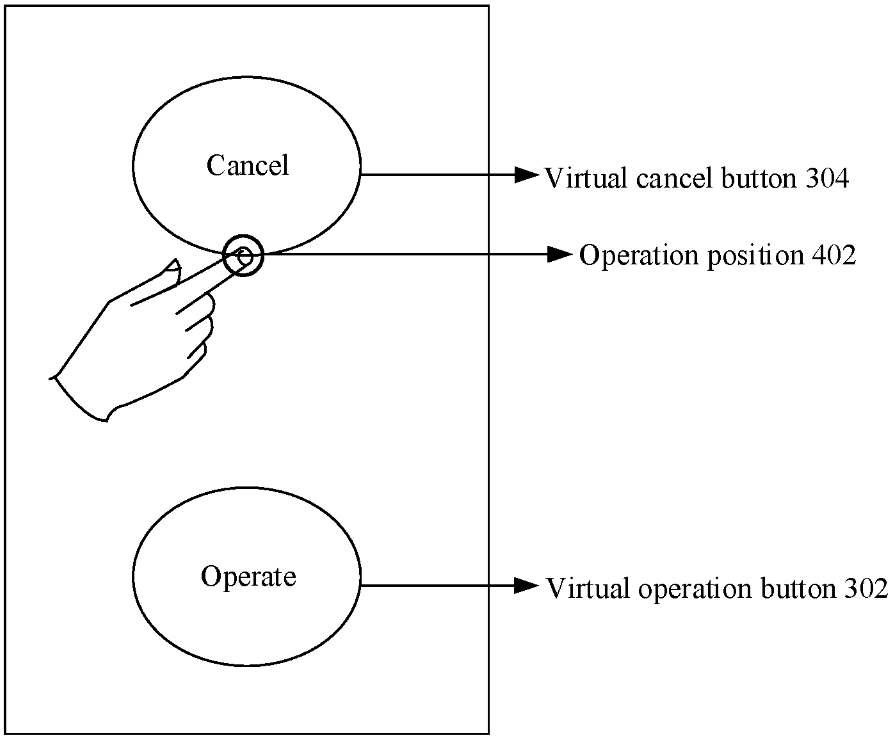
FIG. 4 is a schematic diagram of another operation control method according to an embodiment of this application.
Figure 5:
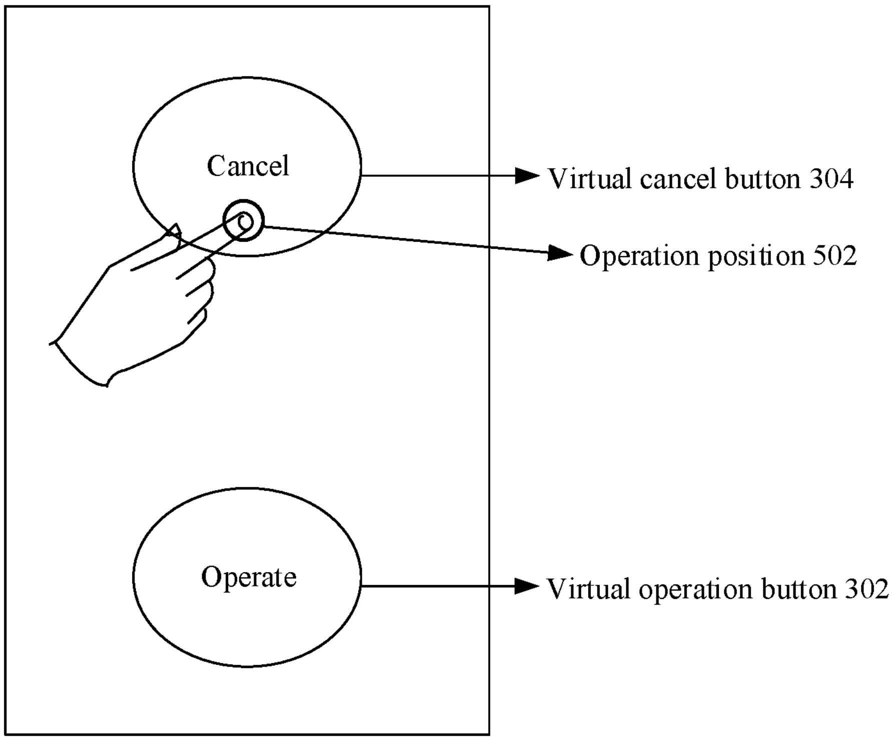
FIG. 5 is a schematic diagram of another operation control method according to an embodiment of this application.

In some embodiments, in this embodiment, the case where the target selection operation ends when the operation position of the target selection operation is located on the virtual cancel button may can include, but is not limited to, overlapping of the operation position of the target selection operation and an area associated with the virtual cancel button. Further, based on the scenario shown in FIG. 3, as shown in FIG. 4, an operation position 402 of a target selection operation and an area associated with a virtual cancel button 304 overlap. Or, based on the scenario shown in FIG. 3, as shown in FIG. 5, an operation position 502 of a target selection operation is within an area associated with a virtual cancel button 304.

The cancellation of the execution of the target operation is controlled by using the virtual cancel button, and the display area of the virtual cancel button is controlled to increase when the operation position of the target selection operation for triggering the execution of the target operation is moved towards the virtual cancel button, so that the display area of the virtual cancel button is flexibly adjusted according to the distance between the operation position of the target selection operation for triggering the execution of the target operation and the virtual cancel button, and the efficiency of operation control is improved.

Figure 6:
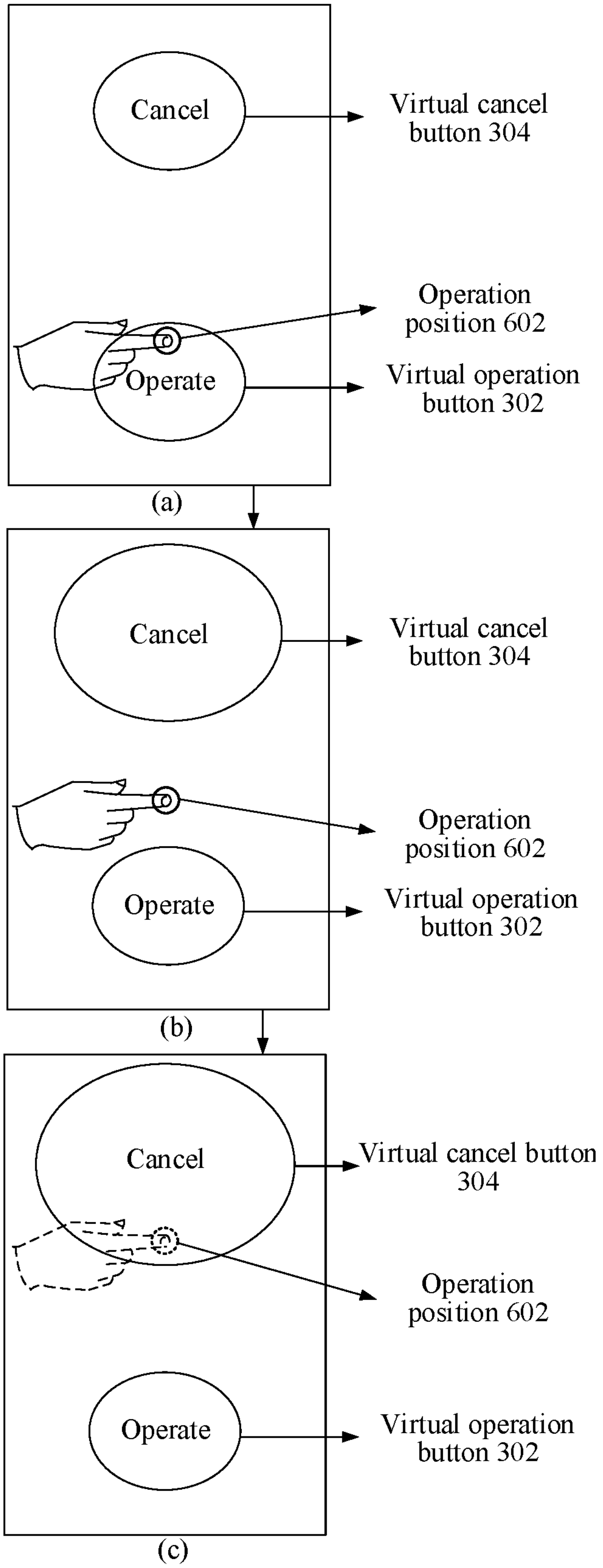
FIG. 6 is a schematic diagram of another operation control method according to an embodiment of this application.

As a further example, based on the scenario shown in FIG. 3, as shown in FIG. 6, a virtual operation button 302 and a virtual cancel button 304 are displayed, the virtual operation button 302 is configured to trigger execution of a target operation, and the virtual cancel button 304 is configured to cancel the execution of the target operation. A target selection operation executed on the virtual operation button 302 is acquired, as shown in (a) of FIG. 6; and further, a state of the target operation is adjusted to a to-be-executed state in response to the target selection operation. Furthermore, as shown in (b) of FIG. 6, a display area of the virtual cancel button 304 is controlled to increase when an operation position 602 of the target selection operation is moved and a distance between the operation position 602 of the target selection operation and the virtual cancel button 304 decreases. Further, as shown in (c) of FIG. 6, the execution of the target operation in the to-be-executed state is canceled when the target selection operation ends when the operation position 602 of the target selection operation is located on the virtual cancel button 304.

According to the embodiments of this application, the user device displays a virtual operation button, the virtual operation button being configured to trigger execution of a target operation; displays a virtual cancel button in response to a target selection operation executed on the virtual operation button, and adjusts a state of the target operation to a to-be-executed state, the virtual cancel button being configured to cancel the execution of the target operation; controls a display area of the virtual cancel button to increase when an operation position of the target selection operation is moved and a distance between the operation position of the target selection operation and the virtual cancel button decreases; and cancels the execution of the target operation in the to-be-executed state when the target selection operation ends when the operation position of the target selection operation is located on the virtual cancel button. The cancellation of the execution of the target operation is controlled by using the virtual cancel button, and the display area of the virtual cancel button is controlled to increase when the operation position of the target selection operation for triggering the execution of the target operation is moved towards the virtual cancel button, so that the purpose of flexibly adjusting the display area of the virtual cancel button according to the distance between the operation position of the target selection operation for triggering the execution of the target operation and the virtual cancel button is achieved, and the technical effect of improving the efficiency of operation control is achieved.

In some embodiments, the operation of controlling a display area of the virtual cancel button to increase when an operation position of the target selection operation is moved and a distance between the operation position of the target selection operation and the virtual cancel button decreases includes:

S1: Display that the virtual cancel button is enlarged from a preset display area to a target display area when the operation position of the target selection operation is moved and the distance between the operation position of the target selection operation and the virtual cancel button continuously decreases; or S2: Display that the virtual cancel button is continuously enlarged when the operation position of the target selection operation is moved and the distance between the operation position of the target selection operation and the virtual cancel button continuously decreases.

In some embodiments, in this embodiment, the process of controlling the display area of the virtual cancel button to increase by the user device may be, but is not limited to, continuous, or may be, but is not limited to, fixed. The continuous process may be understood as, but is not limited to, that the user device displays that the virtual cancel button is continuously enlarged when the operation position of the target selection operation is moved and the distance between the operation position of the target selection operation and the virtual cancel button continuously decreases. The user device continuously increases the display area of the virtual cancel button, which is more beneficial for the user to operate and improves the operation efficiency. The fixed process may be understood as, but is not limited to, that the user device displays that the virtual cancel button is enlarged from the preset display area to the fixed target display area when the operation position of the target selection operation is moved and the distance between the operation position of the target selection operation and the virtual cancel button continuously decreases. The user device enlarges the virtual cancel button to the fixed target display area for display, which may realize the balance between the display area of the virtual cancel button and the screen display content to avoid excessive occlusion of the screen display content by the virtual cancel button, which is beneficial for the user to operate.

In some embodiments, the operation of controlling a display area of the virtual cancel button to increase when an operation position of the target selection operation is moved and a distance between the operation position of the target selection operation and the virtual cancel button decreases includes:

the display area of the control virtual cancel button is controlled to increase when the operation position of the target selection operation is moved towards the virtual cancel button.

In some embodiments, in this embodiment, the case where the operation position of the target selection operation is moved towards the virtual cancel button may be understood as, but is not limited to, that the operation position of the target selection operation in the user device satisfies an orientation condition relative to a direction of the virtual cancel button.

Figure 7:
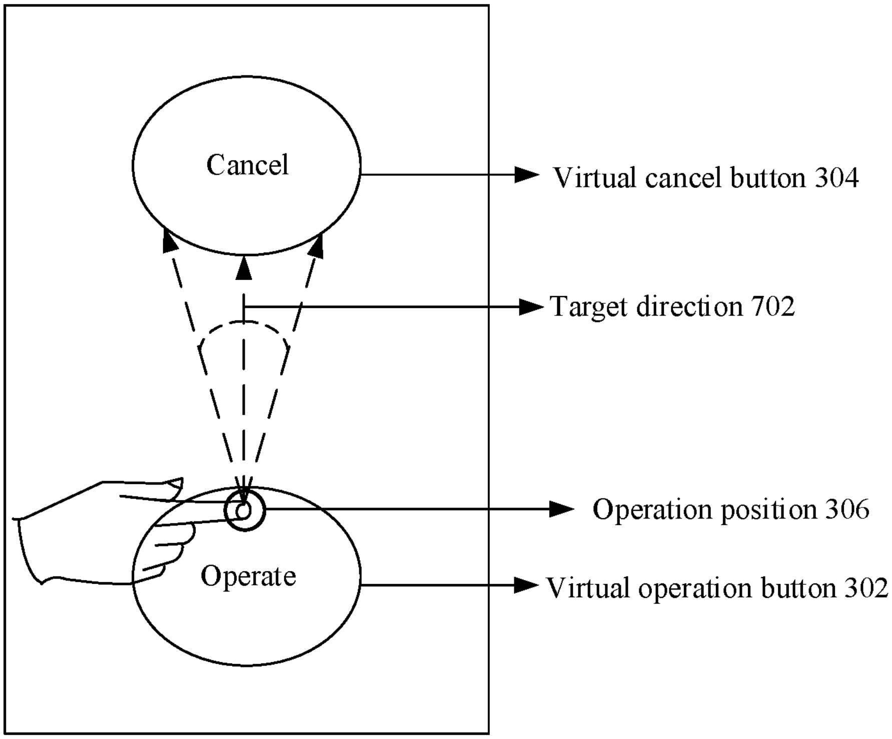
FIG. 7 is a schematic diagram of another operation control method according to an embodiment of this application.

As a further example, based on the scenario shown in FIG. 3, as shown in FIG. 7, a target direction 702 may be understood as, but is not limited to, a reference direction of an operation position 306 relative to a virtual cancel button 304 severing as a reference. Further, the user device may determine, but is not limited to, a direction that differs from the target direction 702 by an angle less than or equal to a target angle threshold as a direction that satisfies the orientation condition, and determine an operation position corresponding to the direction that satisfies the orientation condition as an operation position that is moved towards the virtual cancel button. The user device may adjust the display area of the virtual cancel button in time based on a movement direction of the operation position when the operation position of the target selection operation is moved towards the virtual cancel button, which helps improve the efficiency of operation control.

In some embodiments, the operation of controlling a display area of the virtual cancel button to increase when an operation position of the target selection operation is moved and a distance between the operation position of the target selection operation and the virtual cancel button decreases includes:

S1: Control the display area of the virtual cancel button unchanged when the operation position of the target selection operation is moved and the distance between the operation position of the target selection operation and the virtual cancel button is less than a target distance threshold; and S2: Control the display area of the virtual cancel button to increase when the operation position of the target selection operation is moved and the distance between the operation position of the target selection operation and the virtual cancel button is greater than or equal to the target distance threshold.

In some embodiments, in this embodiment, the distance between the operation position of the target selection operation and the virtual cancel button corresponds to the user's intention of whether to cancel the execution of the target operation. However, in practice, the user triggers the target selection operation and moves the operation position of the target selection operation, which is likely to be an operation habit, or indicates that the user wants to execute the target operation at an appropriate time and does not really want to cancel the execution of the target operation. If the display area of the virtual cancel button is directly controlled to increase when the operation position of the target selection operation is moved and the distance between the operation position of the target selection operation and the virtual cancel button decreases, problems such as misoperation may occur. In order to overcome this problem, a pre-control function may be set, but is not limited to, to secondarily determine whether the user really wants to cancel the execution of the target operation.

The user device controls the display area of the virtual cancel button to increase only when the operation position of the target selection operation is moved and the distance between the operation position of the target selection operation and the virtual cancel button is greater than or equal to the target distance threshold. On the contrary, the user device controls the display area of the virtual cancel button unchanged when the operation position of the target selection operation is moved and the distance between the operation position of the target selection operation and the virtual cancel button is less than the target distance threshold. The user device determines the change of the display area of the virtual cancel button according to the target distance threshold, which may reduce the occurrence of misoperation.

In some embodiments, the operation of controlling a display area of the virtual cancel button to increase when an operation position of the target selection operation is moved and a distance between the operation position of the target selection operation and the virtual cancel button decreases includes:

S1: Display the virtual cancel button with a first display area when the operation position of the target selection operation is moved and the distance between the operation position of the target selection operation and the virtual cancel button is a first distance; and S2: Display the virtual cancel button with a second display area when the operation position of the target selection operation is moved and the distance between the operation position of the target selection operation and the virtual cancel button is a second distance, the second distance being less than the first distance, and the second display area being greater than the first display area.

In some embodiments, in this embodiment, the distance between the operation position of the target selection operation and the virtual cancel button may correspond to, but is not limited to, the display area of the virtual cancel button that is controlled to change.

According to the embodiments of this application, the user device displays the virtual cancel button with the first display area when the operation position of the target selection operation is moved and the distance between the operation position of the target selection operation and the virtual cancel button is the first distance; and the user device displays the virtual cancel button with the second display area when the operation position of the target selection operation is moved and the distance between the operation position of the target selection operation and the virtual cancel button is the second distance, the second distance being less than the first distance, and the second display area being greater than the first display area. The purpose of efficiently controlling the display area of the virtual cancel button is achieved through comparison of the distance values, and the effect of improving the efficiency of operation control is achieved.

In some embodiments, the operation of controlling a display area of the virtual cancel button to increase when an operation position of the target selection operation is moved and a distance between the operation position of the target selection operation and the virtual cancel button decreases includes:

S1: Display the virtual cancel button with a third display area when the operation position of the target selection operation is moved and the distance between the operation position of the target selection operation and the virtual cancel button is within a first distance threshold range, the first distance threshold range corresponding to the third display area; and S2: Display the virtual cancel button with a fourth display area when the operation position of the target selection operation is moved and the distance between the operation position of the target selection operation and the virtual cancel button is within a second distance threshold range, the second distance threshold range corresponding to the fourth display area, a distance threshold in the second distance threshold range being less than a distance threshold in the first distance threshold range, and the fourth display area being greater than the third display area.

In some embodiments, in this embodiment, the distance threshold for the distance between the operation position of the target selection operation and the virtual cancel button may correspond to, but is not limited to, the display area of the virtual cancel button that is controlled to change.

According to the embodiments of this application, the user device displays the virtual cancel button with the third display area when the operation position of the target selection operation is moved and the distance between the operation position of the target selection operation and the virtual cancel button is within the first distance threshold range, the first distance threshold range corresponding to the third display area; and the user device displays the virtual cancel button with the fourth display area when the operation position of the target selection operation is moved and the distance between the operation position of the target selection operation and the virtual cancel button is within the second distance threshold range, the second distance threshold range corresponding to the fourth display area, a distance threshold in the second distance threshold range being less than a distance threshold in the first distance threshold range, and the fourth display area being greater than the third display area. The purpose of efficiently controlling the display area of the virtual cancel button is achieved through determination of the distance threshold ranges, the effect of improving the efficiency of operation control is achieved.

In some embodiments, the operation of canceling the execution of the target operation in the to-be-executed state when the target selection operation ends when the operation position of the target selection operation is located on the virtual cancel button includes:

the user device cancels the execution of the target operation in the to-be-executed state when a target operation position point associated with the target selection operation is located on the virtual cancel button and the target selection operation ends when the number of target operation position points located on the virtual cancel button reaches a trigger threshold, the target selection operation being associated with at least one target operation position point, and the target operation position point being used for determining the operation position of the target selection operation.

In some embodiments, in this embodiment, the target selection operation is usually associated with a plurality of target operation position points. A touch operation is taken as an example, a touch screen area reaching a certain range may represent, but is not limited to, triggering of a target selection operation, an operation position point contained in the touch screen area may be understood as, but is not limited to, a target operation position point, or an operation position point satisfying a preset condition in all the operation position points contained in the touch screen area may be understood as a target operation position point. The preset condition may be, but is not limited to, that a distance from a central point of the touch screen area is less than or equal to an operation distance, and the like. The user device cancels the execution of the target operation in the to-be-executed state when the number of target operation position points located on the virtual cancel button reaches the trigger threshold, which may ensure the accuracy of cancellation for the target operation.

In some embodiments, the operation of controlling a display area of the virtual cancel button to increase includes: the display area of the virtual cancel button is controlled to increase from a preset display area. In some embodiments, the operation control method further includes: the display area of the virtual cancel button is restored to the preset display area when the execution of the target operation is canceled.

The preset display area is an initial display area of the virtual cancel button, and the virtual cancel button is enlarged on the basis of the preset display area. The user device restores the display area of the virtual cancel button to the preset display area when the execution of the target operation is canceled, that is, restores the increased display area to the initial preset display area for display, so as to realize the resetting of the display area of the virtual cancel button. The execution condition of the target operation may be characterized through the change of the display area of the virtual cancel button, which helps improve the efficiency of operation control.

In an implementation, the operation of controlling a display area of the virtual cancel button to increase includes: the display area of the virtual cancel button is controlled to increase from a preset display area. The operation control method further includes: the display area of the virtual cancel button is restored to the preset display area when an end position of the target selection operation is located outside an area where the virtual cancel button is located.

The virtual cancel button is enlarged on the basis of the preset display area. The user device restores the display area of the virtual cancel button to the preset display area when the end position of the target selection operation is located outside the area where the virtual cancel button is located, that is, restores the increased display area to the initial preset display area for display, so as to realize the resetting of the display area of the virtual cancel button. The execution condition of the target operation may be characterized through the change of the display area of the virtual cancel button, which helps improve the efficiency of operation control.

Figure 8:
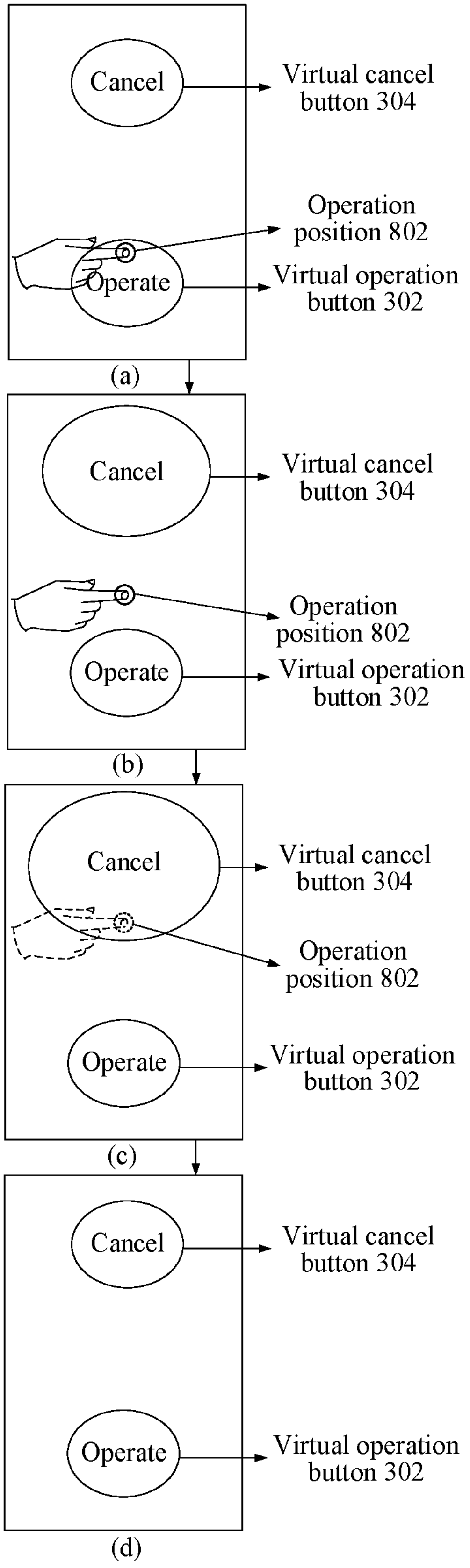
FIG. 8 is a schematic diagram of another operation control method according to an embodiment of this application.

As a further example, based on the scenario shown in FIG. 3, as shown in FIG. 8, a user device displays a virtual operation button 302 and a virtual cancel button 304, the virtual operation button 302 is configured to trigger execution of a target operation, and the virtual cancel button 304 is configured to cancel the execution of the target operation. The user device acquires a target selection operation executed on the virtual operation button 302, as shown in (a) of FIG. 8; and further, the user device adjusts a state of the target operation to a to-be-executed state in response to the target selection operation. Furthermore, as shown in (b) of FIG. 8, the user device controls the virtual cancel button 304 to enlarge from a preset display area when an operation position 802 of the target selection operation is moved and a distance between the operation position 802 of the target selection operation and the virtual cancel button 304 decreases. Further, as shown in (c) of FIG. 8, the user device cancels the execution of the target operation in the to-be-executed state when the target selection operation ends when the operation position 802 of the target selection operation is located on the virtual cancel button 304. As shown in (d) of FIG. 8, the user device restores the display area of the virtual cancel button 304 to the preset display area when the execution of the target operation is canceled.

In some embodiments, the operation of controlling a display area of the virtual cancel button to increase when an operation position of the target selection operation is moved and a distance between the operation position of the target selection operation and the virtual cancel button decreases includes:

- the display area of the virtual cancel button is controlled to increase when the target selection operation is a long-press operation for the virtual operation button, a touch control position of the long-press operation is moved, and a distance between the touch control position of the long-press operation and the virtual cancel button decreases; or
- the display area of the virtual cancel button is controlled to increase when the target selection operation is a continuous selection operation (such as a floating selection operation) for the virtual operation button, a continuous selection position of the continuous selection operation is moved, and a distance between the continuous selection position and the virtual cancel button decreases.

In this embodiment, the user device controls the display area of the virtual cancel button to increase when the touch control position of the long-press operation for the virtual operation button is moved and the distance between the touch control position and the virtual cancel button decreases. The purpose of flexibly adjusting the display area of the virtual cancel button according to the distance between the operation position of the target selection operation for triggering the execution of the target operation and the virtual cancel button is achieved, and the technical effect of improving the efficiency of operation control is achieved.

In some embodiments, the operation control method further includes:

- display that the display virtual cancel button is moved towards the virtual operation button when the operation position of the target selection operation is moved and the distance between the operation position of the target selection operation and the virtual cancel button decreases.

The user device displays that the virtual cancel button is moved towards the virtual operation button when the operation position of the target selection operation is moved and the distance between the operation position of the target selection operation and the virtual cancel button decreases.

Figure 9:
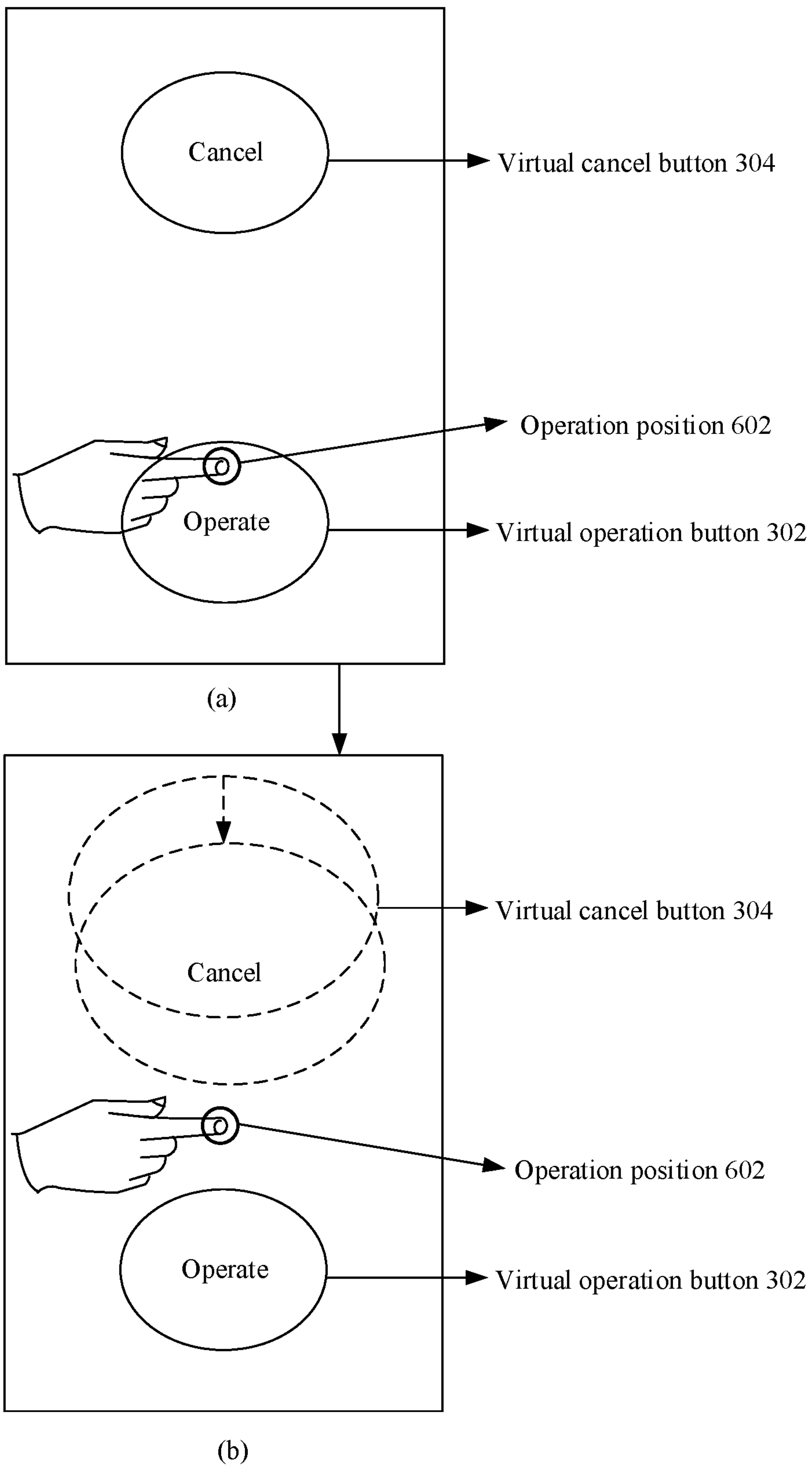
FIG. 9 is a schematic diagram of another operation control method according to an embodiment of this application.

As a further example, based on the scenario shown in FIG. 3, as shown in FIG. 9, a user device displays a virtual operation button 302 and a virtual cancel button 304, the virtual operation button 302 is configured to trigger execution of a target operation, and the virtual cancel button 304 is configured to cancel the execution of the target operation. The user device acquires a target selection operation executed on the virtual operation button 302, as shown in (a) of FIG. 9; and further, the user device adjusts a state of the target operation to a to-be-executed state in response to the target selection operation. Furthermore, as shown in (b) of FIG. 9, the user device controls the virtual cancel button 304 to enlarge from a preset display area and displays that the virtual cancel button 304 is moved towards the virtual operation button 302 when an operation position 602 of the target selection operation is moved and a distance between the operation position 602 of the target selection operation and the virtual cancel button 304 decreases.

According to the embodiments of this application, it is displayed that the virtual cancel button is moved towards the virtual operation button when the operation position of the target selection operation is moved and the distance between the operation position of the target selection operation and the virtual cancel button decreases, so that the purpose of flexibly adjusting the position of the virtual cancel button relative to the virtual operation button is achieved, and the technical effect of improving the efficiency of operation control is achieved.

In some embodiments, for ease of understanding, the foregoing operation control method is applied to a game scenario. In some embodiments, in this embodiment, a virtual operation button (skill button) is configured to trigger execution of a target operation controlled by a virtual character in a virtual scene, the target operation may be, but is not limited to, a character skill of the virtual character, and a virtual cancel button (cancel button) is configured to cancel the execution of the foregoing character skill.

In order to make it easier for a player to select a button for canceling casting of a skill, a display area of the cancel button is set to be flexibly adjusted based on a distance between the player's finger and the cancel button. For example, the shorter the distance is, the larger the cancel button is, and the larger the corresponding hot area is, so that the player selects the cancel button more easily to complete the operation.

Figure 10:
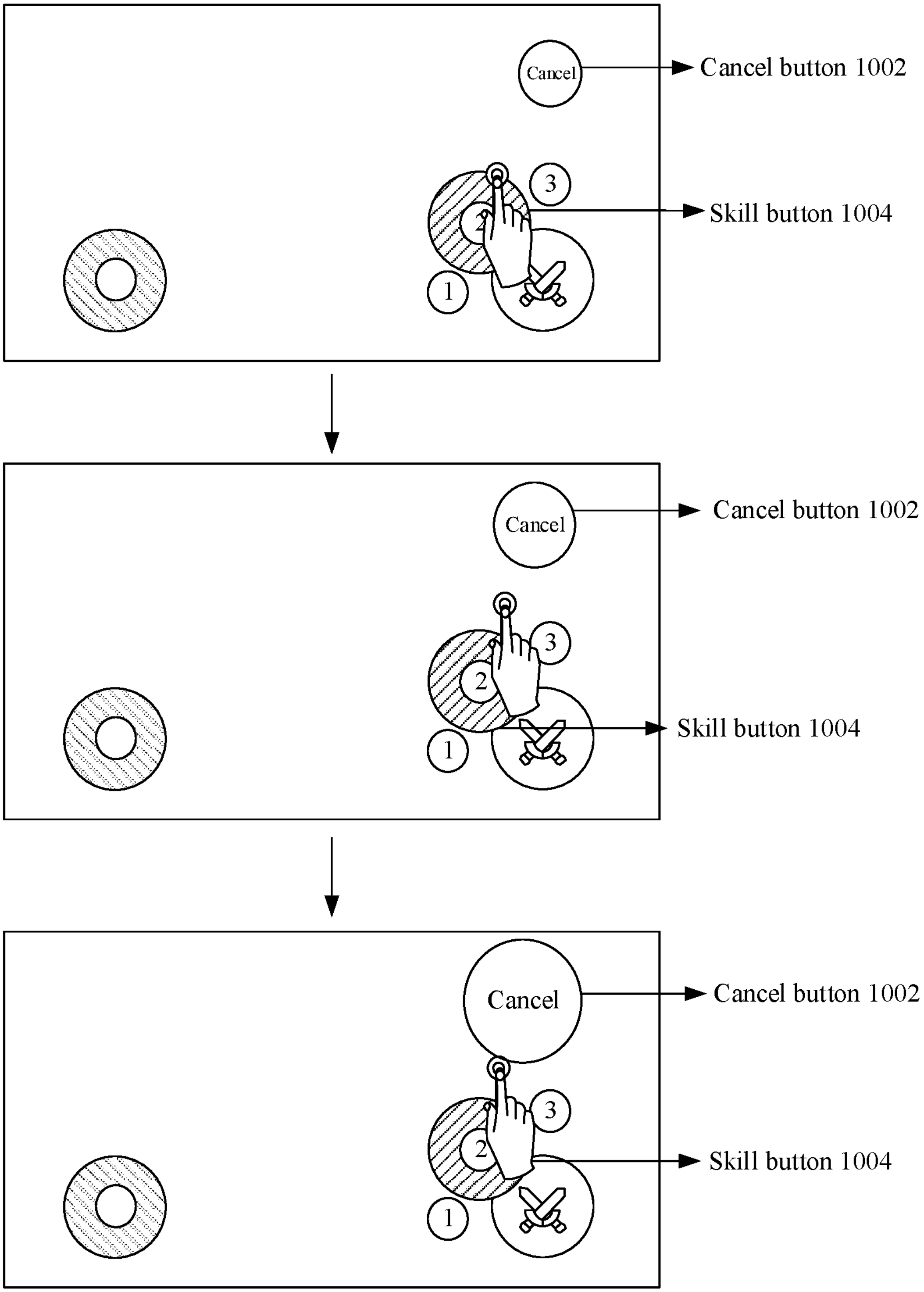
FIG. 10 is a schematic diagram of another operation control method according to an embodiment of this application.

As a further example, as shown in FIG. 10, a user device controls a cancel button 1002 to enlarge at a constant rate during movement and approaching when a signal for indicating that the player presses and holds a skill button 1004 to move towards the cancel button 1002 is acquired, so that the hot area for the player to complete the cancel operation is large and easier to operate.

Figure 11:
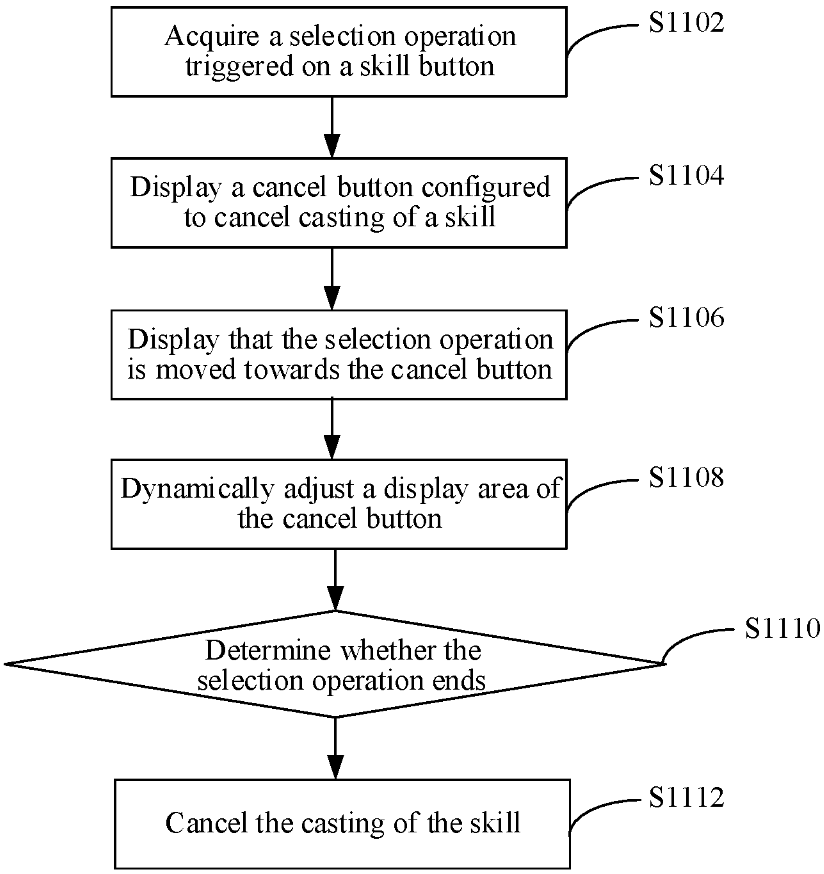
FIG. 11 is a schematic diagram of another operation control method according to an embodiment of this application.

As a further example, as shown in FIG. 11, a user device performs the following specific steps:

step S1102: Acquire a selection operation triggered on a skill button;

step S1104: Display a cancel button configured to cancel casting of a skill;

step S1106: Display that the selection operation is moved towards the cancel button;

step S1108: Dynamically adjust a display area of the cancel button;

step S1110: Determine whether the selection operation ends; and step S1112: Cancel the casting of the skill.

In some embodiments, in this embodiment, if a radius of the cancel button is r, r1 is a minimum radius of the cancel button, and r2 is a maximum radius of the cancel button; and a distance between the center of the circle of the cancel button and a finger is set as a, and r=x/a, where x is a constant. A distance between the center of a circle of each skill button and the center of the circle of the cancel button is set as a1, r1=x/a1, and a value of x is obtained. According to a set value of r2 and the determined value of x, a shortest distance a2 between the finger and the cancel button is derived, and r2=x/a2, that is, the cancel button will no longer be enlarged when the distance between the finger and the center of the circle of the cancel button is less than or equal to a2. Whether the cancel button is displayed is determined according to: whether the player's finger presses and holds a certain skill and does not leave a mobile phone screen. Whether the casting of the skill is canceled is determined according to: whether the player's finger presses and holds the cancel skill button and leaves the mobile phone screen.

According to the embodiments of this application, the requirement for the accuracy of the player's operation is reduced, the corresponding hots area is allowed to vary dynamically with the distance from the finger, the closer the finger is, the larger the button is, and the easier it is for the player to select the button, making the overall operating experience smoother and more friendly.

It is to be understood that in the specific implementation modes of this application, relevant data such as user information is involved. When the foregoing embodiments of this application are applied to a specific product or technology, the user's permission or consent shall be obtained, and the collection, use, and processing of the relevant data shall comply with the relevant laws and regulations and standards of relevant countries and regions.

For simple description, the foregoing method embodiments are described as a series of action combination. However, those skilled in the art shall know that this application is not limited to any described action order, as some steps may be performed in other orders or performed simultaneously according to this application. In addition, those skilled in the art shall also know that all the embodiments described in the description are exemplary embodiments, and the related actions and modules are not necessarily mandatory to this application.

Figure 12:
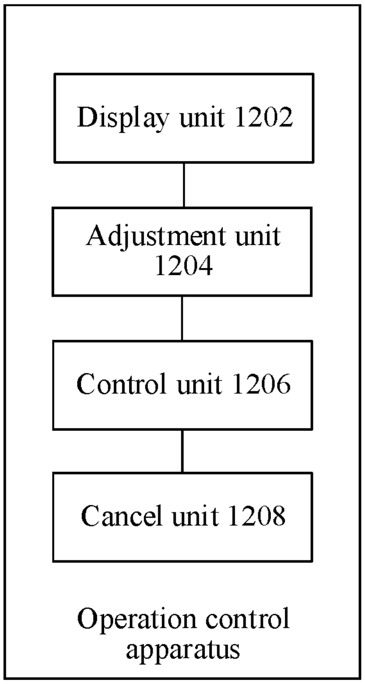
FIG. 12 is a schematic diagram of an operation control apparatus according to an embodiment of this application.

In another aspect, the embodiments of this application further provide an operation control apparatus configured to implement the foregoing operation control method. As shown in FIG. 12, the apparatus includes:

a display unit 1202, configured to display a virtual operation button, the virtual operation button being configured to trigger execution of a target operation;

an adjustment unit 1204, configured to display a virtual cancel button in response to a target selection operation executed on the virtual operation button, and adjust a state of the target operation to a to-be-executed state, the virtual cancel button being configured to cancel the execution of the target operation;

a control unit 1206, configured to control a display area of the virtual cancel button to increase when an operation position of the target selection operation is moved and a distance between the operation position of the target selection operation and the virtual cancel button decreases; and a cancel unit 1208, configured to cancel the execution of the target operation in the to-be-executed state when the target selection operation ends when the operation position of the target selection operation is located on the virtual cancel button.

Specific embodiments may refer to the foregoing examples of the operation control method.

According to the embodiments of this application, a virtual operation button is displayed, the virtual operation button being configured to trigger execution of a target operation; a virtual cancel button is displayed in response to a target selection operation executed on the virtual operation button, and a state of the target operation is adjusted to a to-be-executed state, the virtual cancel button being configured to cancel the execution of the target operation; a display area of the virtual cancel button is controlled to increase when an operation position of the target selection operation is moved and a distance between the operation position of the target selection operation and the virtual cancel button decreases; and the execution of the target operation in the to-be-executed state is canceled when the target selection operation ends when the operation position of the target selection operation is located on the virtual cancel button. The cancellation of the execution of the target operation is controlled by using the virtual cancel button, and the display area of the virtual cancel button is controlled to increase when the operation position of the target selection operation for triggering the execution of the target operation is moved towards the virtual cancel button, so that the purpose of flexibly adjusting the display area of the virtual cancel button according to the distance between the operation position of the target selection operation for triggering the execution of the target operation and the virtual cancel button is achieved, and the technical effect of improving the efficiency of operation control is achieved.

In some embodiments, the control unit 1206 includes:

a first display module, configured to display that the virtual cancel button is enlarged from a preset display area to a target display area when the operation position of the target selection operation is moved and the distance between the operation position of the target selection operation and the virtual cancel button continuously decreases; or a second display module, configured to display that the virtual cancel button is continuously enlarged when the operation position of the target selection operation is moved and the distance between the operation position of the target selection operation and the virtual cancel button continuously decreases.

Specific embodiments may refer to the foregoing examples of the operation control method, which are not described in detail here.

In some embodiments, the control unit 1206 includes:

a first control module, configured to control the display area of the virtual cancel button to increase when the operation position of the target selection operation is moved towards the virtual cancel button.

Specific embodiments may refer to the foregoing examples of the operation control method, which are not described in detail here.

In some embodiments, the control unit 1206 includes:

a second control module, configured to control the display area of the virtual cancel button unchanged when the operation position of the target selection operation is moved and the distance between the operation position of the target selection operation and the virtual cancel button is less than a target distance threshold; and a third control module, configured to control the display area of the virtual cancel button to increase when the operation position of the target selection operation is moved and the distance between the operation position of the target selection operation and the virtual cancel button is greater than or equal to the target distance threshold.

Specific embodiments may refer to the foregoing examples of the operation control method, which are not described in detail here.

In some embodiments, the control unit 1206 includes:

a third display module, configured to display the virtual cancel button with a first display area when the operation position of the target selection operation is moved and the distance between the operation position of the target selection operation and the virtual cancel button is a first distance; and a fourth display module, configured to display the virtual cancel button with a second display area when the operation position of the target selection operation is moved and the distance between the operation position of the target selection operation and the virtual cancel button is a second distance, the second distance being less than the first distance, and the second display area being greater than the first display area.

Specific embodiments may refer to the foregoing examples of the operation control method, which are not described in detail here.

In some embodiments, the control unit 1206 includes:

a fifth display module, configured to display the virtual cancel button with a third display area when the operation position of the target selection operation is moved and the distance between the operation position of the target selection operation and the virtual cancel button is within a first distance threshold range, the first distance threshold range corresponding to the third display area; and a sixth display module, configured to display the virtual cancel button with a fourth display area when the operation position of the target selection operation is moved and the distance between the operation position of the target selection operation and the virtual cancel button is within a second distance threshold range, the second distance threshold range corresponding to the fourth display area, a distance threshold in the second distance threshold range being less than a distance threshold in the first distance threshold range, and the fourth display area being greater than the third display area.

Specific embodiments may refer to the foregoing examples of the operation control method, which are not described in detail here.

In some embodiments, the cancel unit 1208 includes:

a first cancel module, configured to cancel the execution of the target operation in the to-be-executed state when a target operation position point associated with the target selection operation is located on the virtual cancel button and the target selection operation ends when the number of target operation position points located on the virtual cancel button reaches a trigger threshold, the target selection operation being associated with at least one target operation position point, and the target operation position point being used for determining the operation position of the target selection operation.

Specific embodiments may refer to the foregoing examples of the operation control method, which are not described in detail here.

In some embodiments, the control unit 1206 includes: a fourth control module, configured to control the display area of the virtual cancel button to increase from a preset display area.

The apparatus further includes: a second cancel module, configured to restore the display area of the virtual cancel button to the preset display area when the execution of the target operation is canceled; or a third cancel module, configured to restore the display area of the virtual cancel button to the preset display area when an end position of the target selection operation is located outside an area where the virtual cancel button is located.

Specific embodiments may refer to the foregoing examples of the operation control method, which are not described in detail here.

In some embodiments, the control unit 1206 includes:

a fifth control module, configured to control the display area of the virtual cancel button to increase when the target selection operation is a long-press operation for the virtual operation button, a touch control position of the long-press operation is moved, and a distance between the touch control position of the long-press operation and the virtual cancel button decreases.

Specific embodiments may refer to the foregoing examples of the operation control method, which are not described in detail here.

In some embodiments, the apparatus further includes:

a seventh display module, configured to display that the virtual cancel button is moved towards the virtual operation button when the operation position of the target selection operation is moved and the distance between the operation position of the target selection operation and the virtual cancel button decreases.

Specific embodiments may refer to the foregoing examples of the operation control method, which are not described in detail here.

Figure 13:
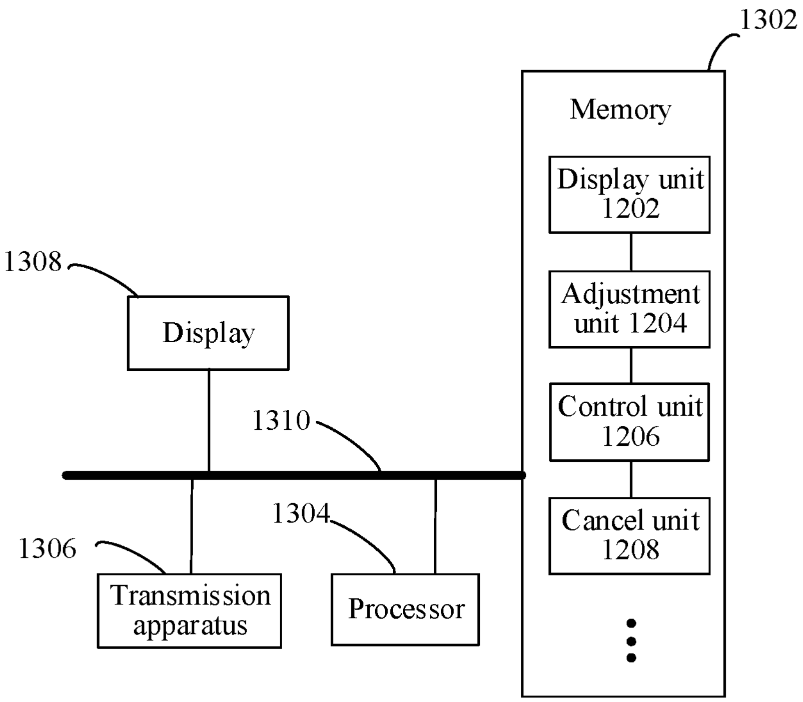
FIG. 13 is a schematic structural diagram of an electronic device according to an embodiment of this application.

In still another aspect, the embodiments of this application further provide an electronic device configured to implement the foregoing operation control method. As shown in FIG. 13, the electronic device includes a memory 1302 and a processor 1304, the memory 1302 stores a computer-readable instruction that, when executed by the processor 1304, performs the steps in any one of the foregoing method embodiments.

In some embodiments, in this embodiment, the foregoing electronic device may be located in at least one of multiple network devices in a computer network.

In some embodiments, in this embodiment, the foregoing processor may be configured to execute the computer-readable instruction to perform the following steps:

S1: Display a virtual operation button, the virtual operation button being configured to trigger execution of a target operation;

S2: Display a virtual cancel button in response to a target selection operation executed on the virtual operation button, and adjust a state of the target operation to a to-be-executed state, the virtual cancel button being configured to cancel the execution of the target operation;

S3: Control a display area of the virtual cancel button to increase when an operation position of the target selection operation is moved and a distance between the operation position of the target selection operation and the virtual cancel button decreases; and S4: Cancel the execution of the target operation in the to-be-executed state when the target selection operation ends when the operation position of the target selection operation is located on the virtual cancel button.

In some embodiments, those of ordinary skill in the art may understand that the structure shown in FIG. 13 is merely exemplary. The electronic device may be a terminal device such as a smartphone (such as an Android mobile phone and an iOS mobile phone), a tablet computer, a palmtop computer, a mobile Internet device (MID), and a PAD. FIG. 13 does not limit the structure of the foregoing electronic device. For example, the electronic device may further include more or less components (such as a network interface) than those shown in FIG. 13, or has a configuration different from that shown in FIG. 13.

The memory 1302 may be configured to store a software readable instruction and module, such as a computer-readable instruction/module corresponding to the operation control method and apparatus according to the embodiments of this application. The processor 1304 runs the computer-readable instruction and module stored in the memory 1302, so as to perform various function applications and data processing, that is, implement the foregoing operation control method. The memory 1302 may include a high-speed random memory, and may also include a non-transitory memory, such as one or more magnetic storage apparatuses, a flash memory, and other non-transitory solid-state memories. In some examples, the memory 1302 may further include memories remotely disposed relative to the processor 1304, and the remote memories may be connected to a terminal through a network. Examples of the foregoing network include, but are not limited to, the Internet, an intranet, a local area network, a mobile communication network, and a combination thereof. The memory 1302 may be specifically configured to, but is not limited to, store information such as a target operation, a target selection operation, an operation position, and a display area. As an example, as shown in FIG. 13, the foregoing memory 1302 may include, but is not limited to, the display unit 1202, the adjustment unit 1204, the control unit 1206, and the cancel unit 1208 in the foregoing operation control apparatus. In addition, the memory may include, but is not limited to, other modular units in the foregoing operation control apparatus, which is not described in detail here.

In some embodiments, the foregoing transmission apparatus 1306 is configured to receive or transmit data through a network. Specific examples of the foregoing network may include a wired network and a wireless network. In an example, the transmission apparatus 1306 includes a network interface controller (NIC), which may be connected to another network device and a router through a network cable, so as to communicate with the Internet or a local area network. In an example, the transmission apparatus 1306 is a radio frequency (RF) module, which is configured to communicate with the Internet in a wireless manner.

In addition, the foregoing electronic device includes: a display 1308, configured to display information such as the foregoing target operation, target selection operation, operation position, and display area; and a connection bus 1310, configured to connect the module components in the foregoing electronic device.

In other embodiments, the foregoing terminal device or server may be a node in a distributed system, the distributed system may be a blockchain system, and the blockchain system may be a distributed system formed by connecting a plurality of nodes in a network communication manner. The nodes may form a Peer To Peer (P2P) network, and any type of computing device, such as a server, a terminal, and other electronic devices, may become a node in the blockchain system by joining the P2P network.

In an aspect, the embodiments of this application provide a computer program product, which includes a computer-readable instruction. The computer-readable instruction contains program codes used for performing the method shown in the flowchart. In such an embodiment, the computer-readable instruction may be downloaded and installed from a network through a communication part, and/or installed from a removable medium. The computer-readable instruction is executed by a central processing unit to perform the functions according to the embodiments of this application.

The sequence numbers of the foregoing embodiments of this application are merely for description purpose but do not imply the preference among the embodiments.

A computer system of the electronic device is merely an example, and does not constitute any limitation to functions and use ranges of the embodiments of this application.

The computer system includes a central processing unit (CPU), which may perform various suitable actions and processing according to a computer-readable instruction stored in a read-only memory (ROM) or a computer-readable instruction loaded from a storage part into a random access memory (RAM). The RAM further stores various computer-readable instructions and data required for system operations. The central processing unit, the read-only memory, and the random access memory are connected to each other via a bus. An input/output (I/O) interface is also connected to the bus.

The following components are connected to the I/O interface: an input part including a keyboard and a mouse; an output part including a cathode ray tube (CRT), a liquid crystal display (LCD), and a speaker; a storage part including a hard disk; and a communication part including a network interface card such as a local area network card and a modem. The communication part is configured to perform communication processing through a network such as the Internet. A driver is also connected to the I/O interface as needed. A removable medium, such as a magnetic disk, an optical disk, a magneto-optical disk, and a semiconductor memory, is installed on the drive as needed, so that a computer-readable instruction read from the removable medium is installed into the storage part as needed.

Particularly, according to the embodiments of this application, the processes described in the flowcharts of the methods may be implemented as computer-readable instructions. For example, the embodiments of this application provide a computer program product, which includes a computer-readable instruction carried on a computer-readable medium. The computer-readable instruction contains program codes used for performing the method shown in the flowchart. In such an embodiment, the computer-readable instruction may be downloaded and installed from a network through the communication part, and/or installed from the removable medium. The computer-readable instruction is executed by the CPU to perform the functions defined in the system of this application.

In an aspect, the embodiments of this application provide a computer-readable storage medium. A processor of a computer device reads a computer instruction from the computer-readable storage medium and executes the computer instruction to cause the computer device to perform the method according to the foregoing implementation modes.

In some embodiments, in this embodiment, the foregoing computer-readable storage medium may be configured to store a computer-readable instruction used for performing the following steps:

S1: Display a virtual operation button, the virtual operation button being configured to trigger execution of a target operation;

S2: Display a virtual cancel button in response to a target selection operation executed on the virtual operation button, and adjust a state of the target operation to a to-be-executed state, the virtual cancel button being configured to cancel the execution of the target operation;

S3: Control a display area of the virtual cancel button to increase when an operation position of the target selection operation is moved and a distance between the operation position of the target selection operation and the virtual cancel button decreases; and

S4: Cancel the execution of the target operation in the to-be-executed state when the target selection operation ends when the operation position of the target selection operation is located on the virtual cancel button.

In some embodiments, in this embodiment, those of ordinary skill in the art may understand that all or some steps in the methods according to the foregoing embodiments may be performed by a computer-readable instruction by instructing related hardware of a terminal device. The computer-readable instruction may be stored in a computer-readable storage medium, which may include: a flash disk, a read-only memory (ROM), a random access memory (RAM), a magnetic disk, an optical disk, and the like.

The sequence numbers of the foregoing embodiments of this application are merely for description purpose but do not imply the preference among the embodiments.

When the integrated unit in the foregoing embodiments is implemented in the form of a software functional unit and sold or used as an independent product, the integrated unit may be stored in the foregoing computer-readable storage medium. Based on such an understanding, the technical solutions of this application essentially, or a part contributing to the related art, or all or some of the technical solutions may be implemented in the form of a software product. The computer software product is stored in a storage medium and includes several instructions for instructing one or more computer devices (which may be a personal computer, a server, a network device, or the like) to perform all or some of the steps in the methods according to the embodiments of this application.

In the foregoing embodiments of this application, the descriptions of the embodiments have respective focuses. A part that is not described in detail in an embodiment may refer to related descriptions in other embodiments.

In some embodiments of this application, it is to be understood that the disclosed client may be implemented in other manners. The foregoing apparatus embodiments are merely exemplary. For example, the division of the units is merely the division of logic functions, and may use other division manners during actual implementation. For example, a plurality of units or components may be combined, or may be integrated into another system, or some features may be omitted or not performed. In addition, the coupling, or direct coupling, or communication connection between the displayed or discussed components may be the indirect coupling or communication connection through some interfaces, units or modules, and may be in electrical or other manners. In this application, the term "module" or "unit" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module or unit can be implemented using one or more processors (or processors and memory). Likewise, a processor (or processors and memory) can be used to implement one or more modules or units. Moreover, each module or unit can be part of an overall module or unit that includes the functionalities of the module or unit.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, the functional units in the embodiments of this application may be integrated into one processing unit, or each of the units may be physically separated, or two or more units may be integrated into one unit. The integrated unit may be implemented in the form of hardware, or may be implemented in the form of a software functional unit.

The above are merely exemplary implementation modes of this application. It is to be pointed out that those of ordinary skill in the art may further make several improvements and modifications without departing from the principle of this application, and these improvements and modifications shall fall within the scope of protection of this application.

What is claimed is:

1. An operation control method performed by an electronic device, the method comprising:

displaying a virtual operation button, the virtual operation button being configured to trigger execution of a target operation;

in response to a target selection operation executed on the virtual operation button, setting a state of the target operation to a to-be-executed state;

updating a display area of a virtual cancel button in accordance with a current distance between an operation position of the target selection operation and the virtual cancel button, further including:

dynamically increasing the display area of the virtual cancel button when the current distance between the operation position of the target selection operation and the virtual cancel button decreases continuously; and canceling the to-be-executed state of the target operation when the target selection operation terminates within the display area of the virtual cancel button.

2. The method according to claim 1, wherein the updating a display area of a virtual cancel button in accordance with a current distance between an operation position of the target selection operation and the virtual cancel button comprises:

decreasing the display area of the virtual cancel button when the distance between the operation position of the target selection operation and the virtual cancel button increases.

3. The method according to claim 1, wherein:

the display area of the virtual cancel button remains unchanged when the distance between the operation position of the target selection operation and the virtual cancel button is less than a target distance threshold.

4. The method according to claim 1, wherein the canceling the to-be-executed state of the target operation when the target selection operation terminates within the display area of the virtual cancel button comprises:

canceling the to-be-executed state of the target operation in the to-be-executed state when a number of target operation position points associated with the target selection operation within the display area of the virtual cancel button reaches a trigger threshold.

5. The method according to claim 1, wherein the method further comprises:

restoring the display area of the virtual cancel button to a preset display area when the to-be-executed state of the target operation is canceled.

6. The method according to claim 1, wherein the method further comprises:

restoring the display area of the virtual cancel button to a preset display area when the target selection operation terminates outside the display area of the virtual cancel button.

7. The method according to claim 1, wherein the method further comprises:

moving the virtual cancel button towards the virtual operation button when the distance between the operation position of the target selection operation and the virtual cancel button decreases.

8. The method according to claim 1, wherein the method further comprises:

adjusting the state of the target operation from the to-be-executed state to an executing state when the target selection operation terminates outside the display area of the virtual cancel button.

9. An electronic device, comprising a memory and a processor, the memory storing a computer-readable instruction that, when executed by the processor, causes the electronic device to perform an operation control method including:

displaying a virtual operation button, the virtual operation button being configured to trigger execution of a target operation;

in response to a target selection operation executed on the virtual operation button, setting a state of the target operation to a to-be-executed state;

updating a display area of a virtual cancel button in accordance with a current distance between an operation position of the target selection operation and the virtual cancel button, further including:

dynamically increasing the display area of the virtual cancel button when the current distance between the operation position of the target selection operation and the virtual cancel button decreases continuously; and canceling the to-be-executed state of the target operation when the target selection operation terminates within the display area of the virtual cancel button.

10. The electronic device according to claim 9, wherein the updating a display area of a virtual cancel button in accordance with a current distance between an operation position of the target selection operation and the virtual cancel button comprises:

decreasing the display area of the virtual cancel button when the distance between the operation position of the target selection operation and the virtual cancel button increases.

11. The electronic device according to claim 9, wherein the display area of the virtual cancel button remains unchanged when the distance between the operation position of the target selection operation and the virtual cancel button is less than a target distance threshold.

12. The electronic device according to claim 9, wherein the canceling the to-be-executed state of the target operation when the target selection operation terminates within the display area of the virtual cancel button comprises:

canceling the to-be-executed state of the target operation in the to-be-executed state when a number of target operation position points associated with the target selection operation within the display area of the virtual cancel button reaches a trigger threshold.

13. The electronic device according to claim 9, wherein the method further comprises:

restoring the display area of the virtual cancel button to a preset display area when the to-be-executed state of the target operation is canceled.

14. The electronic device according to claim 9, wherein the method further comprises:

restoring the display area of the virtual cancel button to a preset display area when the target selection operation terminates outside the display area of the virtual cancel button.

15. The electronic device according to claim 9, wherein the method further comprises:

moving the virtual cancel button towards the virtual operation button when the distance between the operation position of the target selection operation and the virtual cancel button decreases.

16. The electronic device according to claim 9, wherein the method further comprises:

adjusting the state of the target operation from the to-be-executed state to an executing state when the target selection operation terminates outside the display area of the virtual cancel button.

17. A non-transitory computer-readable storage medium, storing a computer-readable instruction that, when executed by a processor of an electronic device, causes the electronic device to perform an operation control method including:

displaying a virtual operation button, the virtual operation button being configured to trigger execution of a target operation;

in response to a target selection operation executed on the virtual operation button, setting a state of the target operation to a to-be-executed state;

updating a display area of a virtual cancel button in accordance with a current distance between an operation position of the target selection operation and the virtual cancel button, further including:

dynamically increasing the display area of the virtual cancel button when the current distance between the operation position of the target selection operation and the virtual cancel button decreases continuously; and canceling the to-be-executed state of the target operation when the target selection operation terminates within the display area of the virtual cancel button.

18. The non-transitory computer-readable storage medium according to claim 17, wherein the updating a display area of a virtual cancel button in accordance with a current distance between an operation position of the target selection operation and the virtual cancel button comprises:

decreasing the display area of the virtual cancel button when the distance between the operation position of the target selection operation and the virtual cancel button increases.

19. The non-transitory computer-readable storage medium according to claim 17, wherein the canceling the to-be-executed state of the target operation when the target selection operation terminates within the display area of the virtual cancel button comprises:

canceling the to-be-executed state of the target operation in the to-be-executed state when a number of target operation position points associated with the target selection operation within the display area of the virtual cancel button reaches a trigger threshold.

20. The non-transitory computer-readable storage medium according to claim 17, wherein the method further comprises:

restoring the display area of the virtual cancel button to a preset display area when the to-be-executed state of the target operation is canceled.

* * * * *